June 14, 1949.　　　　D. TAYLOR ET AL　　　　2,472,927
TESTING DEVICE FOR FILAMENTARY MATERIAL
Filed Oct. 10, 1944　　　　　　　　　　　　3 Sheets-Sheet 1
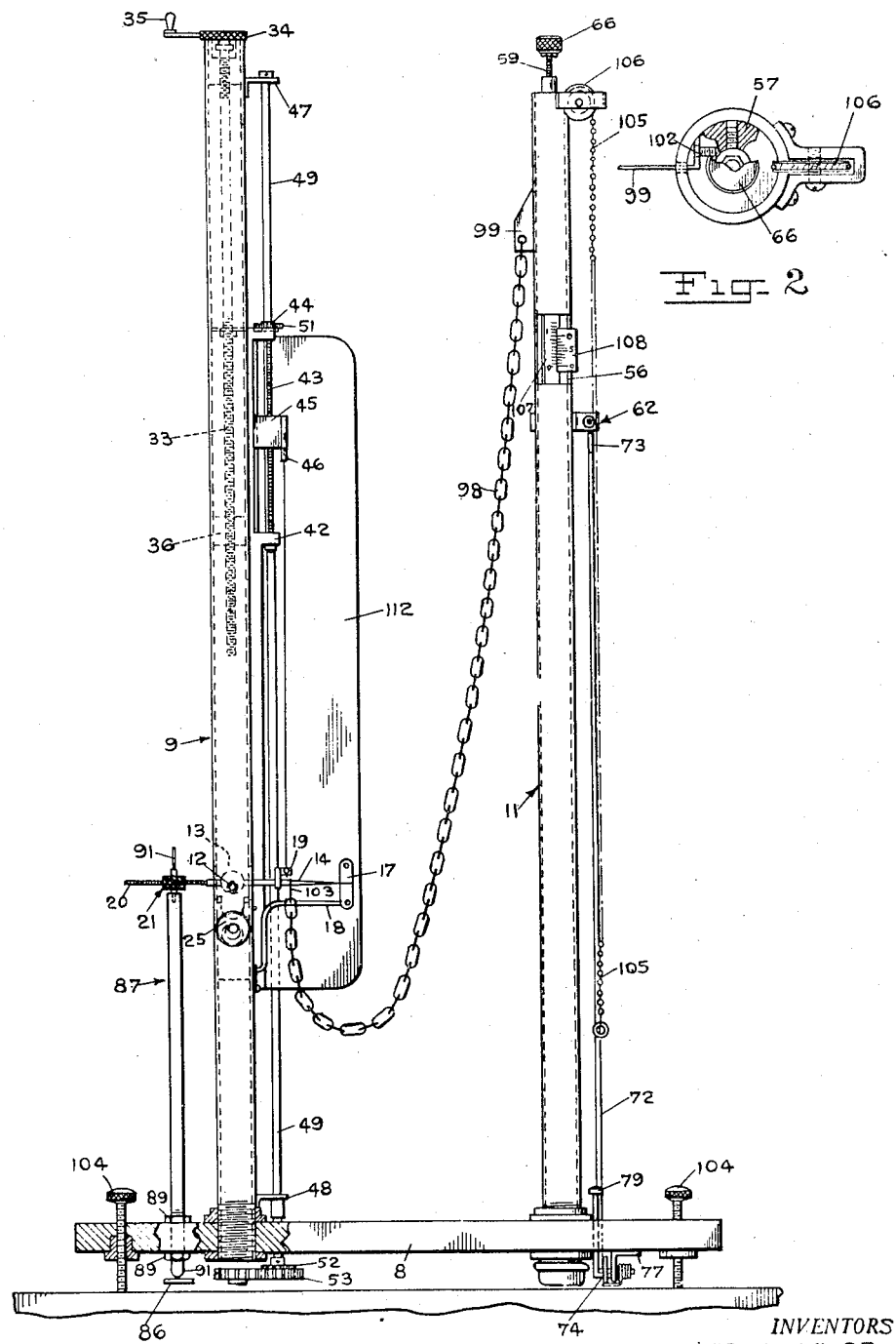
INVENTORS.
DAVID TAYLOR.
ERNEST R. WARD
BY
ATTORNEYS.

June 14, 1949.　　　D. TAYLOR ET AL　　　2,472,927
TESTING DEVICE FOR FILAMENTARY MATERIAL
Filed Oct. 10, 1944　　　3 Sheets-Sheet 2
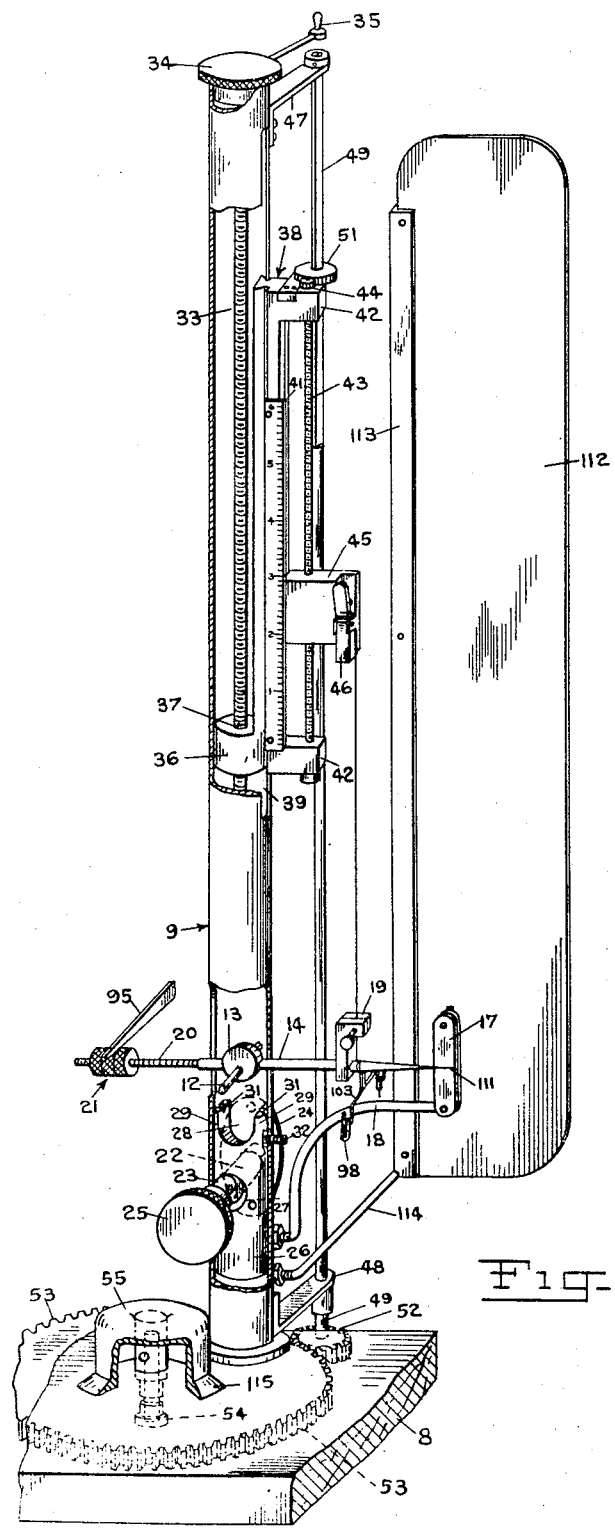
INVENTORS.
DAVID TAYLOR.
ERNEST R. WARD.
BY
ATTORNEYS.

June 14, 1949. D. TAYLOR ET AL 2,472,927
TESTING DEVICE FOR FILAMENTARY MATERIAL
Filed Oct. 10, 1944 3 Sheets-Sheet 3
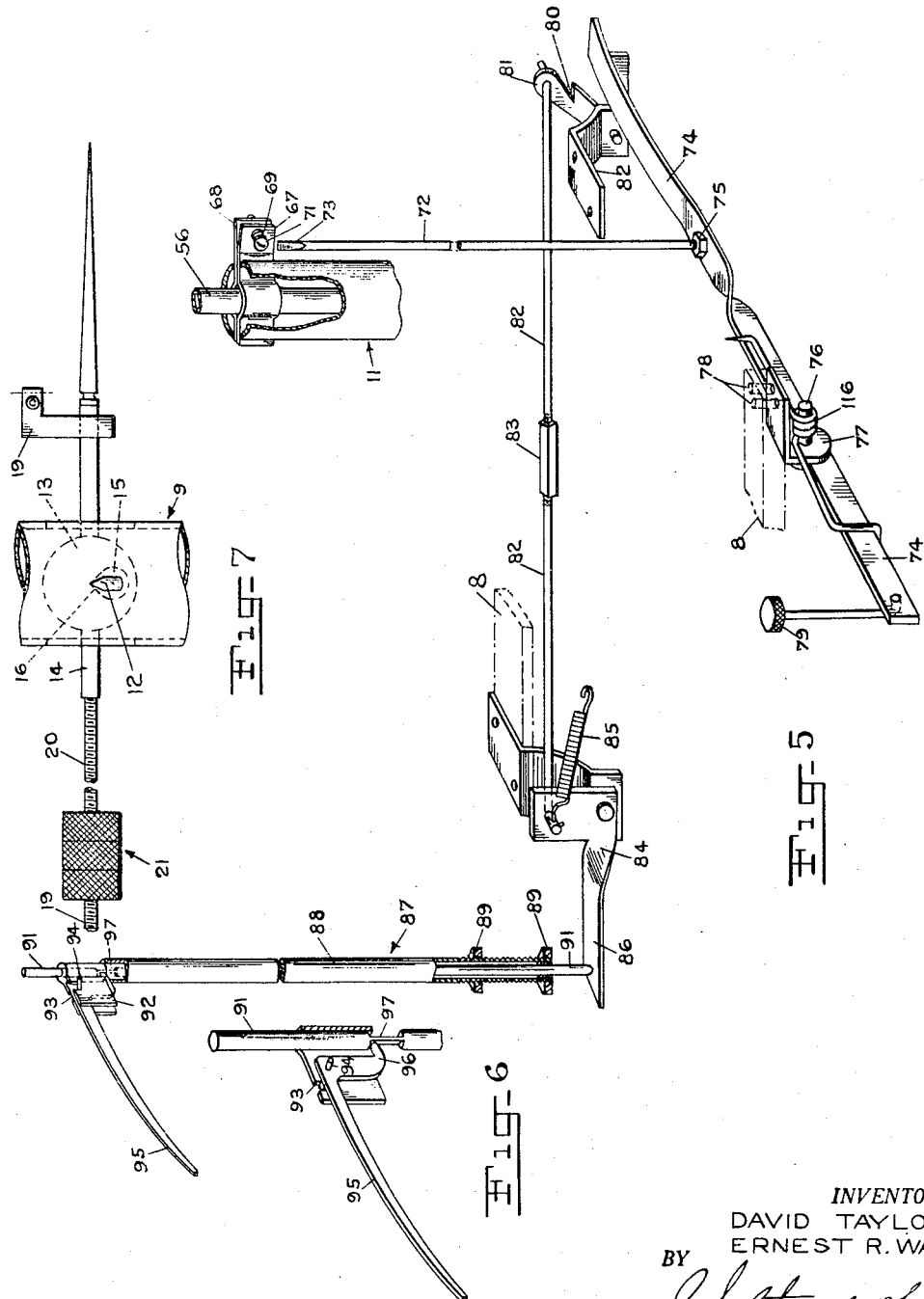
INVENTORS.
DAVID TAYLOR.
ERNEST R. WARD.
BY
ATTORNEYS Patented June 14, 1949

2,472,927

UNITED STATES PATENT OFFICE 2,472,927

TESTING DEVICE FOR FILAMENTARY MATERIAL

David Taylor, Princeton, W. Va., and Ernest Robert Ward, Narrows, Va., assignors to Celanese Corporation of America, a corporation of Delaware Application October 10, 1944, Serial No. 557,954

12 Claims. (Cl. 73—95)

1

This invention relates to a testing device, and relates more particularly to a device for testing filaments.

An object of this invention is the provision of a novel device for measuring the elongation of filaments and for determining the tenacity thereof.

Other objects of this invention, together with certain details of construction and combinations of parts, will appear from the following detailed description and the appended claims.

In the accompanying drawings,

Figure 1 is a front elevational view of the testing device of the invention partly in section to show certain details and with certain details omitted in the interest of clarity, Figure 2 is a top plan view of one of the posts, also partly in section, Figure 3 is an enlarged detail view of a post of the novel testing device, parts of the post being broken away to show certain details of construction more clearly, Figure 4 is an enlarged detail view of the other post of the testing device, parts of this post also being broken away to show certain details of construction, Figure 5 is a perspective view of the elements arranged between and connecting the two posts of the testing device, Figure 6 is an enlarged detail view of the top of the tripping mechanism, and Figure 7 is an enlarged detail view of the pointer supporting arrangement.

Like reference numerals indicate like parts throughout the several views of the drawings.

Referring now to the drawings for a detailed description of our novel testing device, the reference numeral 8 indicates a base support, preferably of wood, on which are mounted two posts generally indicated by the reference numerals 9 and 11, respectively, which posts are cylindrical in form. In post 9 is fixed a knife-edge pivot 12 on which is adapted to be pivotally supported a bearing member 13 carrying therein a balanced pointer 14. The bearing member 13 is provided with an opening 15 having an inverted V-shape portion 16 adapted to rest on the knife-edge pivot 12. The pointed end of pointer 14 cooperates with an indicator plate 17 carried by a bracket 18 suitably attached to post 9. The pointed end of the pointer 14 is provided with a clamp 19. The opposite end of the pointer is threaded at 20 and carries knurled nut counterweights 21 adapted to move along the length of said threaded portion 20 for balancing the pointer.

Means are provided for lifting the bearing member and pointer 14 from the pivot 12 and maintaining the same in inoperative position when the device is not in use in a testing operation. The lifting means comprises an eccentric 22 on a shaft 23 journaled at one end in a disc 24 and having at its other end an end knob 25 by which said eccentric is rotated manually. The rotation of said knob 25 causes eccentric 22 to raise a plug 26 mounted for movement within the cylindrical post 9. The plug 26 is provided with an opening 27 through which eccentric 22 extends and has at its upper end a cut-away portion 28 forming two projections 29 in which are formed slots 31 adapted to receive said pointer and to move the same off pivot 12. The pointer is held in this position by means of a spring operated pin 32 until it is desired to use the same, thereupon the knob 21 is again rotated and, through eccentric 22, effects the lowering of the plug 26, pulling the slots 31 from under pointer 14, permitting the bearing member 13 to rest on pivot 12 in operative position.

In the upper portion of cylindrical post 9 is mounted a threaded rod 33 on which is fixed a knob 34 provided with a handle 35 for rotating said knob and thereby threaded rod 33. Carried on said threaded rod 33 for movement relative thereto is a cylindrical plug 36 having a threaded hole 37 through which threaded rod 33 passes. The plug 36 supports a bracket, generally indicated by reference numeral 38, extending through a vertical slot 39 in the post 9. The bracket 38 has fixed thereto a scale 41 divided into suitable units, such as millimeters or inches. The bracket is provided with extensions 42 in which is rotatably mounted a threaded rod 43, the upper end of which has fixed thereto a gear 44. The threaded rod 43 has mounted thereon for movement relative thereto, a carriage 45 carrying a clamp 46.

Suitably attached to post 9 are brackets 47 and 48 in which is journaled a rod 49. The upper portion of said rod 49 may be substantially square or rectangular in cross-section and slidably carries a gear 51 for cooperation with the gear 44. To the lower end of said rod 49 is fixed a gear 52 for cooperation with a gear 53 mounted on a shaft 54 journaled in base 8. The upper portion of shaft 54 extends through the top surface of base 8 and has attached thereto a cup-shaped hand grip 55 by which the rotation of gear 53 is manually effected.

The lower portion of cylindrical post 11 is filled with oil, which cushions and regulates the downward movement of a cylindrical tube 56 and block 57 in which it is carried in the interior of said cylindrical post 11. The tube 56 near its lower end has threaded thereon a piston 58, and extending through said tube 56 is a threaded rod 59 held in position by screw threaded bearing members 61. When the tube 56 is released by braking means 62, hereinafter more fully described, the weight of the tube 56, block 57, piston 58, and rod 59 creates a pressure on the oil in the post 11 causing the oil to flow around a conical plug 63 fixed to the end of rod 59 into the cylindrical tube 56 and out of this tube into post 11 through openings 64 and 65. The larger the opening at the bottom of cylindrical tube 56, the faster the oil can escape and, therefore, the more rapid the descent of tube 56. The size of the opening at the bottom of the tube 56 may be adjusted by means of said conical plug 63 which is adapted to be raised or lowered within the opening at the bottom of tube 56 by rotating a knurled knob 66 fixed to the upper end of rod 59.

The braking means comprises brake bands 67 and 68 normally held together by means of a spring 69 carried on a pin 71 extending through the brake bands. The braking means may be released by means of a rod 72 having a wedge-shape tip 73 which may be driven between brake bands 67 and 68 to spread them apart by spring-loaded lever 74 to which rod 72 is suitably attached as by means of a nut or nuts 75. The lever 74 is pivotally mounted on stub shaft 76 carried by a bracket 77 fixed in any suitable manner, as by pins or screws 78, to the base 8. Means are provided for raising rods 72 to release the braking means and to hold the same in a brake releasing position, said means comprising a button 79 which when pressed downward causes lever 74 to move counterclockwise about its pivot thus raising the opposite end of the lever and rod 72, the lever being caught in notch 80 of a lever 81. The lever 81 is pivotally mounted in a bracket 82 which may be fixed to base 8. Also attached to lever 81 is a two-piece connecting rod 82 joined together by an adjusting turn-buckle 83. The connecting rod is attached to a bell-crank lever 84 normally held in raised position by means of a spring 85, one end of which is attached to the bell-crank lever 84 and the other to base 8.

Arm 86 of bell-crank lever 84 is adapted to cooperate with a tripping mechanism, generally indicated by reference numeral 87, comprising a cylindrical tube 88 fixed by means of nuts 89 to base 8. Slidably mounted in tube 88 is a rod 91 the lower end of which is adapted to rest on arm 86 of bell-crank lever 84 and the upper end of which carries a bracket 92 fixed thereto. The bracket 92 is provided with notches 93 and journaled in said notches is a pin 94 carrying tripping member 95 for cooperating with end 26 of pointer 14. A dog 96 integral with the tripping member cooperates with a shouldered reduced portion 97 of rod 91 to hold the latter in a predetermined position.

A chain 98 of any suitable metal is attached at one end to a plate 99 extending through a slot 101 in post 11 and fixed, as by means of screws 102, to block 57. The other end of the chain 98 is attached to a bale 103 carried by pointer 14.

The base 8 may be provided with leveling screws 104 and with a level (not shown).

Before beginning a test of a filament, button 79 is pressed downward thus rotating lever 74 about its pivot and raising rod 72 to drive the wedge-shaped top end 73 between the brake bands 67 and 68 releasing piston rod 49. The chain 105, which is attached to block 57 and is carried over an idler pulley 106 pivotally mounted at the top of post 11, is pulled down until the zero on scale 107 on tube 56 lines up with the zero on the vernier 108 attached to post 11 in slot 109 formed in said post. The construction is such that the plate 99 will strike the top of slot 101 in post 11 when the zeros on the scales 107 and 108 line up. The piston 58 and tube 56 are then locked in this zero position by pushing up member 95 to trip the braking mechanism and cause braking means 62 to function, i. e. to hold tube 56 against movement in post 11.

The component elements in post 9 are now arranged to receive the specimen filament. The length of the specimen will determine the location of cylindrical plug 36 along the threaded rod 33. Carriage 45 carrying clamp 46 is lowered to the zero point on scale 41 by turning hand grip 55 counterclockwise. This turning of hand grip 55 effects the rotation of gear 53, gear 52, rod 49, gear 51, gear 44 and threaded rod 43 on which said carriage 45 is mounted. Knob 34 is then rotated by means of handle 35 in a clockwise or counter-clockwise direction, thus rotating the threaded rod 37 to raise or lower the plug 36 to increase or decrease the distance between clamp 46 and clamp 19 for accommodating the length of the specimen. With the scale on post 9 and the scale on post 11 both at their zero points, the knob 25 is rotated and through eccentric 22 lowers the plug 26 pulling the slots in its top end from under pointer 14 allowing the bearing member 13 of the pointer 14 to come to rest on knife-edge pivot 12. The pointer 14 is then balanced by means of knurled nut weights 21 until the pointed end is centered on the hair line 111 on indicator plate 17. The device is now balanced and knob 25 is rotated to cause the eccentric 22 to move plug 26 upwardly thus cradling the pointer in slots 31 and lifting the bearing member 13 from the knife-edge pivot 12 to prevent injury to the latter and to effect the steadying of the clamps while inserting the specimen therein. The bearing members should be removed from the knife-edge pivot at all times except when being balanced or when the test is actually being conducted.

The filament specimen is then clamped in jaws 19 and 46 and to facilitate this filament clamping operation there may be provided a background board 112 of black plastic material which may be held in position by means of a channeled strip 113 supported from the post 9 by a bracket 114. After the filament clamping operation, the knob 25 and eccentric 22 are turned, thus lowering the plug 26 and permitting the bearing member 13 of the pointer 14 to come to rest on knife-edge pivot 12. The pointed end of pointer 14 should be exactly centered on hair line 111 of the indicator plate 17. If the pointed end is off center, knob 34 should be turned to move plug 36 to take up any slack in the specimen filament, center the pointed end on the hair line, and to insure the absence of any initial loading on the specimen. The device is now ready to test the filament.

The application of the load is started by depressing button 79, releasing the braking means 62 and permitting the tube 56 and piston 58, together with the other elements attached to tube 56, to move down inside the post 11. The rate of this downward movement and, therefore, the rate of the application of load is governed by the position of conical plug 63 which may be adjusted by turning knob 66 at the upper end of rod 59 attached to said conical plug. The weight of the tube 56 and the elements attached thereto applies a pressure on the oil in post 11 and the oil tends to flow around the conical plug into tube 56 and out of the holes 64 and 65, back into post 11. The larger the opening at the bottom of tube 56, the faster the oil can escape and, therefore, the faster will be the descent of the tube 56 together with the elements attached thereto. The adjustment of this load application speed means should be predetermined and set before the test is begun.

As the tube 56 and the elements connected thereto continue to move down the post 11, the chain plate 99 moves down, changing its relative position with respect to the bale 103 mounted on pointer 14 and to which the other end of the chain 98 is attached. The shape of the chain catenary is changing continually and a larger portion of the weight thereof is shifted to the bale attached to the pointer, and thereby to the specimen. The hand grip 55 is continually turned by the operative, thus turning gear 53, gear 52, rod 49, gear 51, gear 44 and threaded rod 43 causing carriage 45 to be raised to keep the specimen filament taut and supporting the full weight of the chain catenary. The pointed end of pointer 14 must be kept centered on the hair line 111 by the rotation of hand grip 55 to insure the above conditions of load. If the pointer is kept on the hair line by the operative, the elongation of the filament at any time is indicated by the location of carriage 45 along scale 41. When the specimen filament breaks, the total elongation in the gauge length of the specimen filament can be read directly from scale 41 where the bottom of carriage 45 lines up therewith. In place of scale 41, the hand grip 55 may be graduated along its edge 115 and the elongation read directly from the graduations along said edge.

When the specimen filament breaks, the automatic stop assembly functions. The pointer 14 is caused to rotate clockwise causing the knurled nuts to strike tripping member 95, pulling the dog 96 from the shouldered portion 97 of rod 91 allowing the rod to fall freely. Rod 91 strikes arm 86 of bell-crank lever 84, pushing it down in counterclockwise rotation about the pivot against the action of spring 85. The rotation of bell-crank lever 84 causes connecting rod 82 to rotate lever 81 in a counterclockwise direction pulling the notch away from lever 74 which lever snaps downwardly in a clockwise direction due to the action of spring 116 mounted on stub shaft 76. This causes the wedge-shape end 73 of rod 72 to be pulled from between brake bands 67 and 68 which then snap tight on tube 56, stopping the further downward motion of said tube 56 and the elements attached thereto. The load required to break the specimen filament is proportional with the movement of the tube 56 and can be read directly from the calibrated scale 107 and vernier 108.

To prepare the device for another test, the brake 62 is released by depressing the button 79 wedging end 73 of rod 72 between brake bands 67 and 68 spreading them apart and releasing the clamping action. Depressing button 79 also raised lever 74, locking the same in notch 80 in lever 81 and pushes rod 91 up through tube 88 to reset the dog 96 in the shouldered portion 97 of rod 91. Chain 105 is then pulled down and the pressure of the oil against this movement on top of piston 58 forces a plate 117 in the seat 118 of said piston against spring 119 held in position by a washer 121, allowing the oil above piston 58 to flow freely through holes 122 in said piston 58 downwardly back into the lower portion of post 11. The holes 122 are sealed by the plate 117 by the action of the oil pressure in any downward movement of the tube 56 and piston 58. Thus, the loading mechanism is returned to the zero position on scales 107 and vernier 108. To hold it in this position, the tripping member 95 is lifted tripping the brake mechanism as explained above. Carriage 45 is then brought back to its original position by rotating hand grip 55.

It is to be understood that the foregoing detailed description is given merely by way of illustration and that many variations may be made therein without departing from the spirit of our invention.

Having described our invention, what we desire to secure by Letters Patent is:

1. In a device for testing filamentary materials, a post, a bracket carried by and movable relative to said post, a clamp carried by said bracket and movable relative thereto, a pointer pivotally mounted on said post, a clamp mounted on said pointer, the specimen to be tested being mounted in said clamps, a chain having one end attached to said pointer for applying a test load on the specimen held in said clamps, a second post for supporting the other end of said chain, and fluid means mounted in said second post for permitting the end of the chain supported thereby to be lowered in a controlled manner so as to increase the test load on said specimen.

2. In a device for testing filamentary materials, a post, a bracket carried by and movable relative to said post, a clamp carried by said bracket and movable relative thereto, a pointer pivotally mounted on said post, a clamp mounted on said pointer, the specimen to be tested being mounted in said clamps, a chain having one end attached to said pointer for applying a test load on the specimen held in said clamps, a second post for supporting the other end of said chain, means mounted in said second post for permitting the end of the chain supported thereby to be lowered so as to increase the test load on said specimen, said latter means comprising a cylindrical tube movable relative to said second post and having means thereon for supporting said chain, and fluid means cooperating with said tube for controlling the rate of the descent of said tube and said chain.

3. In a device for testing filamentary materials, a post, a bracket carried by and movable relative to said post, a clamp carried by said bracket and movable relative thereto, a pointer pivotally mounted on said post, a clamp mounted on said pointer, the specimen to be tested being mounted in said clamps, a chain having one end attached to said pointer for applying a test load on the specimen held in said clamps, a second post for supporting the other end of said chain, means mounted in said second post for permitting the end of the chain supported thereby to be lowered so as to increase the test load on said specimen, said latter means comprising a cylindrical tube movable relative to said second post and having means thereon for supporting said chain, fluid means cooperating with said tube for controlling the rate of the descent of tube and said chain, a brake carried by said second post and adapted to cooperate with said cylindrical tube to halt the descent thereof and manually operated means for causing said brake to release said tube to permit said tube and said chain to be lowered.

4. In a device for testing filamentary materials, a post, a bracket carried by and movable relative to said post, manually operated means for moving said bracket relative to said post, a clamp carried by said bracket, manually operated means for moving said clamp relative to said bracket, a pointer pivotally mounted on said post, a clamp mounted on said pointer, the specimen to be tested being mounted between said clamps, a chain having one end attached to said pointer for applying a test load on the specimen held in said clamps, a second post for supporting the other end of said chain, means mounted in said post for permitting the end of the chain supported by said post to be lowered so as to increase the test load on said specimen, said latter means comprising a cylindrical tube movable relative to said second post and having means thereon for supporting said chain, and fluid means cooperating with said tube for controlling the rate of the descent of said tube and said chain.

5. In a device for testing filamentary materials, a post, a bracket carried by and movable relative to said post, manually operated means for moving said bracket relative to said post, a clamp carried by said bracket, manually operated means for moving said clamp relative to said bracket, a pointer pivotally mounted on said post, a clamp mounted on said pointer, the specimen to be tested being mounted between said clamps, a chain having one end attached to said pointer for applying a test load on the specimen held in said clamps, a second post for supporting the other end of said chain, means mounted in said post for permitting the end of the chain supported thereby to be lowered so as to increase the test load on said specimen, said latter means comprising a cylindrical tube movable relative to said second post and having means thereon for supporting said chain, fluid means cooperating with said tube for controlling the rate of the descent of said tube and said chain, a brake carried by said second post and adapted to cooperate with said cylindrical tube to halt the descent thereof and manually operated means for causing said brake to release said tube to permit said tube and said chain to be lowered.

6. In a device for testing filamentary materials, a post, a bracket carried by and movable relative to said post, manually operated means for moving said bracket relative to said post, a clamp carried by said bracket, manually operated means for moving said clamp relative to said bracket, a knife-edge pivot fixed in said post, a pointer pivotally mounted on said knife-edge pivot, counterweights carried on one arm of said pointer, and a clamp mounted on the other arm of said pointer, the specimen to be tested being mounted between said clamps, a chain having one end attached to said pointer for applying a test load on the specimen held in said clamps, a second post for supporting the other end of said chain, means mounted in said second post for permitting the end of the chain supported thereby to be lowered so as to increase the test load on said specimen, said latter means comprising a cylindrical tube movable relative to said second post and having means thereon for supporting said chain, and fluid means cooperating with said tube for controlling the rate of the descent of said tube and said chain.

7. In a device of testing filamentary materials, a post, a bracket carried by and movable relative to said post, manually operated means for moving said bracket relative to said post, a clamp carried by said bracket, manually operated means for moving said clamp relative to said bracket, a knife-edge pivot fixed in said post, a pointer pivotally mounted on said knife-edge pivot, counterweights carried on one arm of said pointer, and a clamp mounted on the other arm of said pointer, the specimen to be tested being mounted between said clamps, a chain having one end attached to said pointer for applying a test load on the specimen held in said clamps, a second post for supporting the other end of said chain, means mounted in said second post for permitting the end of the chain supported thereby to be lowered so as to increase the test load on said specimen, said latter means comprising a cylindrical tube movable relative to said second post and having means thereon for supporting said chain, fluid means cooperating with said tube for controlling the rate of the descent of said tube and said chain, a brake carried by said second post and adapted to cooperate with said cylindrical tube to halt the descent thereof and manually operated means for causing said brake to release said tube to permit said tube and said chain to be lowered.

8. In a device for testing filamentary materials, a post, a bracket carried by and movable relative to said post, manually operated means for moving said bracket relative to said post, a clamp carried by said bracket, manually operated means for moving said clamp relative to said bracket, a knife-edge pivot fixed in said post, a pointer pivotally mounted on said knife-edge pivot, means for moving said pointer from said pivot and returning the same thereto, counterweights carried on one arm of said pointer, and a clamp mounted on the other arm of said pointer, the specimen to be tested being mounted between said clamps, a chain having one end attached to said pointer for applying a test load on the specimen held in said clamps, a second post for supporting the other end of said chain, means mounted in said second post for permitting the end of the chain supported thereby to be lowered so as to increase the test load on said specimen, said latter means comprising a cylindrical tube movable relative to said second post and having means thereon for supporting said chain, fluid means cooperating with said tube for controlling the rate of the descent of said tube and said chain, a brake carried by said second post and adapted to cooperate with said cylindrical tube to halt the descent thereof and manually operated means for causing said brake to release said tube to permit said tube and said chain to be lowered.

9. In a device for testing filamentary materials, a post, a bracket carried by and movable relative to said post, manually operated means for moving said bracket relative to said post, a clamp carried by said bracket, manually operated means for moving said clamp relative to said bracket, a knife-edge pivot fixed in said post, a pointer pivotally mounted on said knife-edge pivot, manually operated eccentric means for moving said pointer from said pivot and returning the same thereto, counterweights carried on one arm of said pointer, and a clamp mounted on the other arm of said pointer, the specimen to be tested being mounted between said clamps, a chain having one end attached to said pointer for applying a test load on the specimen held in said clamps, a second post for supporting the other end of said chain, means mounted in said second post for permitting the end of the chain supported thereby to be lowered so as to increase the test load on said specimen, said latter means comprising a cylindrical tube movable relative to said second post and having means thereon for supporting said chain, fluid means cooperating with said tube for controlling the rate of the descent of said tube and said chain, a brake carried by said second post and adapted to cooperate with said cylindrical tube to halt the descent thereof and manually operated means for causing said brake to release said tube to permit said tube and said chain to be lowered.

10. In a device of testing filamentary materials, a post, a bracket carried by and movable relative to said post, manually operated means for moving said bracket relative to said post, a clamp carried by said bracket, manually operated means for moving said clamp relative to said bracket, a knife-edge pivot fixed in said post, a pointer pivotally mounted on said knife-edge pivot, counterweights carried on one arm of said pointer, and a clamp mounted on the other arm of said pointer, the specimen to be tested being mounted between said clamps, a chain having one end attached to said pointer for applying a test load on the specimen held in said clamps, a second post for supporting the other end of said chain, means mounted in said second post for permitting the end of the chain supported thereby to be lowered so as to increase the test load on said specimen, said latter means comprising a cylindrical tube movable relative to said second post and having means thereon for supporting said chain, fluid means cooperating with said tube for controlling the rate of the descent of said tube and said chain, a brake carried by said second post and adapted to cooperate with said cylindrical tube to halt the descent thereof, manually operated means for causing said brake to release said tube to permit said tube and said chain to be lowered, and means operable upon the breaking of the specimen for automatically causing said brake to operate to stop the descent of said tube.

11. In a device of testing filamentary materials, a post, a bracket carried by and movable relative to said post, manually operated means for moving said bracket relative to said post, a clamp carried by said bracket, manually operated means for moving said clamp relative to said bracket, a knife-edge pivot fixed in said post, a pointer pivotally mounted on said knife-edge pivot, counterweights carried on one arm of said pointer, and a clamp mounted on the other arm of said pointer, the specimen to be tested being mounted between said clamps, a chain having one end attached to said pointer for applying a test load on the specimen held in said clamps, a second post for supporting the other end of said chain, means mounted in said second post for permitting the end of the chain supported thereby to be lowered so as to increase the test load on said specimen, said latter means comprising a cylindrical tube movable relative to said second post and having means thereon for supporting said chain, fluid means cooperating with said tube for controlling the rate of the descent of said tube and said chain, a brake carried by said second post and adapted to cooperate with said cylindrical tube to halt the descent thereof, manually operated means for causing said brake to release said tube to permit said tube and said chain to be lowered, and means operable upon the breaking of the specimen for automatically causing said brake to operate to stop the descent of said tube, said means comprising a tripping mechanism adapted to be tripped by the clockwise movement of said pointer.

12. In a device of testing filamentary materials, a post, a bracket carried by and movable relative to said post, manually operated means for moving said bracket relative to said post, a clamp carried by said bracket, manually operated means for moving said clamp relative to said bracket, a knife-edge pivot fixed in said post, a pointer pivotally mounted on said knife-edge pivot, counterweights carried on one arm of said pointer, and a clamp mounted on the other arm of said pointer, the specimen to be tested being mounted between said clamps, a chain having one end attached to said pointer for applying a test load on the specimen held in said clamps, a second post for supporting the other end of said chain, means mounted in said second post for permitting the end of the chain supported thereby to be lowered so as to increase the test load on said specimen, said latter means comprising a cylindrical tube movable relative to said second post and having means thereon for supporting said chain, fluid means cooperating with said tube for controlling the rate of the descent of said tube and said chain, a brake carried by said second post and adapted to cooperate with said cylindrical tube to halt the descent thereof, manually operated means, including a rod adapted to be inserted in said brake, for causing said brake to release said tube to permit said tube and said chain to be lowered, and means operable upon the breaking of the specimen for automatically causing the withdrawal of said rod from said brake to cause said brake to grip said tube and to stop the descent thereof, said latter means comprising a tripping lever adapted to be tripped by the clockwise movement of said pointer and means operatively connecting said tripping lever to said rod.

DAVID TAYLOR.
ERNEST ROBERT WARD.

REFERENCES CITED

The following references are of record in the file of this patent:

UNITED STATES PATENTS

| Number | Name | Date |
|---|---|---|
| 919,140 | Duncan | Apr. 20, 1909 |
| 993,700 | McKnight | May 30, 1911 |
| 1,008,308 | Briercliffe | Nov. 14, 1911 |
| 1,512,491 | Scott | Oct. 21, 1924 |
| 2,445,683 | MacGeorge | July 20, 1948 |

FOREIGN PATENTS

| Number | Country | Date |
|---|---|---|
| 257,634 | Great Britain | Apr. 21, 1927 |